REFRACTORY COMPOSITION AND PROCESS FOR PRODUCING SAME

Filed June 20, 1966

Inventors:
Emile Plumat
Maurice Jaupain
BY
Spencer & Kaye
Attorneys

Inventors:
Emile Plumat
Maurice Jaupain
BY Spencer & Kaye
Attorneys

Inventors:
Emile Plumat
Maurice Jaupain
BY Spencer & Kaye
Attorneys

Inventors:
Emile Plumat
Maurice Jaupain
By Spencer & Kaye
Attorneys

United States Patent Office 3,425,851

Patented Feb. 4, 1969

3,425,851

REFRACTORY COMPOSITION AND PROCESS FOR PRODUCING SAME

Emile Plumat, Gilly, and Maurice Jaupain, Jumet, Belgium, assignors to Glaverbel S.A., Brussels, Belgium Filed June 20, 1966, Ser. No. 558,846
Claims priority, application Luxembourg, June 29, 1965, 48,938
U.S. Cl. 106—55 11 Claims
Int. Cl. C04b *35/00*

ABSTRACT OF THE DISCLOSURE

A refractory composition comprising stannic oxide, and in addition, at least one compound selected from compounds of chromium, tellurium and mixtures thereof. Preferably, the amount of chromium and tellurium or mixtures thereof present in such refractory composition is a maximum of about 20% by weight based on the tin content. A refractory body is prepared by shaping such a composition in wet condition under pressure and subsequently subjecting the same to sintering conditions.

The present invention relates to refractory compositions, and more particularly, to refractory compositions based on stannic oxide.

Stannic oxide is known to have properties which make it potentially very well suited for use in the manufacture of refractory materials for glass-melting furnaces, e.g., for forming refractory blocks, clays or mortars, or glass-melting electrodes.

Stannic oxide in compact masses has a low coefficient of thermal expansion (of the order of $5.10^{-6}$ between 0 and 1000° C.) and an appreciable specific electric conductivity, at least at a high temperature, this conductivity being approximately equal to $10^{-3}$ ohm$^{-1}$ cm.$^{-1}$ at a temperature of 900° C. and $10^{-2}$ ohm$^{-1}$ cm.$^{-1}$ at a temperature of 1100° C. Refractory compositions based on stannic oxide moreover have good resistance to chemical attack by molten glasses of ordinary composition or by other basic or acid substances. Such compositions also show good resistance to oxidizing or non-reducing atmospheres, even at fairly high temperature, so that they can be used in glass-melting furnaces not only for the furnace bottom and side walls below the level of the molten glass, but also in the region of the so-called "flux line" and in a furnace superstructure. The refractory properties of such composition are also good, especially at temperatures below about 1500° C. At this temperature, the vapor pressure of stannic oxide is approximately equal to one tenth of one atmosphere. It would appear that the oxide dissociates as follows:

$$SnO_2 \text{ (solid)} \rightarrow SnO \text{ (gas)} + \tfrac{1}{2} O_2 \text{ (gas)}$$

At temperatures of up to nearly 1500° C., stannic oxide can be considered as inert with respect to molten glass, but during contact with molten glass at temperatures above 1500° C. stannic oxide gives rise to the formation of bubbles in significant quantities. This has been a serious drawback of prior compositions based on stannic oxide.

In addition to this drawback, bricks and other bodies made from stannic oxide by conventional prior art pressing and sintering processes tend to have initially a high porosity and then to shrink appreciably, the shrinkage being of the order of 18 to 20%. This shrinkage causes microscopic cracks in the refractory bodies. Moreover the shrinkage only occurs very slowly and may to a considerable extent occur after the refractory body has been put into use. In the event that a refractory body in contact with molten glass has a porosity exceeding about 5%, the molten glass is liable to penetrate into the pores and to create cavities of substantial size. Once such mechanical and chemical attack commences it is self-accelerating.

The electrical conductivity of prior refractory bodies formed from stannic oxide, while quite high at temperatures of 900° C. and higher, is much lower at lower temperature of the order of 500 to 800° C., the con-glass melting with one end of the electrode immersed in the molten glass and its other end exposed at a lower temperature of the order of 500 to 800° C., the conductivity of the exposed end of the electrode is unfavorably low.

It is also observed that while refractory bodies formed from stannic oxide show good resistance to molten glasses of ordinary composition, they do not behave very well in contact with certain special glasses which exercise a particularly aggressive action on refractories. In such circumstances stannic oxide becomes transformed to tin silicates which are in general of yellow color.

Thus, conventional refractory compositions based on stannic oxide, while possessing certain desirable properties, have not been found to be completely satisfactory in view of the deficiencies and disadvantages discussed above.

It has therefore been the great desire of the industry to develop and produce a refractory composition which utilizes the highly desirable characteristics of stannic oxide while eliminating the inherent deficiencies and disadvantages of prior compositions.

According to the present invention, it has now been discovered that refractories based on stannic oxide and having greatly improved propertres can be prepared by incorporating at least one compound of chromium or tellurium or a mixture of compounds of chromium and tellurium in the refractory composition.

It is therefore a principal object of the present invention to provide a refractory composition based on stannic oxide of improved properties which eliminates the inherent deficiencies and disadvantages of prior compositions.

A further object of the present invention is to provide an improved refractory composition based on stannic oxide having incorporated therein one or more compounds of chromium or tellurium or mixtures of such compounds.

A still further object of the present invention is to provide a process for producing an improved refractory composition based on stannic oxide having incorporated therein one or more compounds of chromium or tellurium or mixtures of such compounds.

Yet a further object of the present invention is to provide refractory walls of a glass-melting furnace composed in whole or in part from the stannic oxide refractory composition of the present invention.

Still further objects and advantages of the product and process of the present invention will become more apparent from the following more detailed description of the invention.

The addition of a compound of chromium or tellurium or a combination of these to a refractory composition based on stannic oxide has been found to be extremely beneficial regardless of whether the remainder of the composition comprises only stannic oxide or stannic oxide and one or more other refractory substances. For example, the basic refractory material may comprise stannic oxide together with zirconia and/or alumina and/or one or more other refractory substances which are compatible with stannic oxide and which may, e.g., be chosen with a view to keeping down the price of the final refractory. As particular examples, the refractory composition may comprise zirconium silicate or zirconium oxide, preferably the latter, in a proportion of up to 50% by weight.

Accordingly, the present invention includes any refractory body based on stannic oxide and incorporating one or more chromium or tellurium compounds. It is of course to be understood that this definition does not exclude the incorporation of one or more chromium compounds and one or more tellurium compounds in one and the same refractory body.

The present invention is particularly directed to refractory bodies containing a proportion of stannic oxide such that the stannic oxide together with the chomium and/or tellurium compound(s) account for at least 50% by weight of the total refractory composition.

For the preparation of a refractory body according to the invention, chromium and/or tellurium may be introduced into the composition from which the body is to be produced in various chemical forms, e.g., oxides, hydroxides, silicates or phosphates such as pyrophosphates. Chromium and/or tellurium compounds in powder form can be introduced into a stannic oxide paste as conventionally formed in the manufacture of sintered stannic oxide refractories. Soluble chromium and/or tellurium compounds, e.g., certain chromates, may if desired be added in solution as wetting agent to stannic oxide masses already shaped, preparatory to being sintered.

The presence of at least one chromium and/or tellurium compound increases the electric conductivity of the refarctory body and this increase is evident even at relatively low temperatures, for instance at temperatures below 900° C. The inclusion of such compounds moreover promotes stabilization of shrinkage so that the formation of perceptible cracks or pores in refractory bricks while in use in a furnace can be substantially reduced or eliminated.

It has also been observed that the presence of chromium or tellurium compounds in stannic oxide refractories used in contact with molten glass appreciably reduces the formation of bubbles in the glass at temperatures approaching 1500° C. and above.

Refarctory masses containing chromium and/or tellurium compounds can be sintered at temperatures up to 1500° C. to a highly compact form, without impairing their properties in any way.

The total amount of the chromium and/or tellurium in a refractory body according to the invention is preferably not more than about 20% by weight based on the weight of the tin. Thus, by way of example, if a refractory mass contains 151 grams of stannic oxide ($SnO_2$), the amount of tin present is 119 grams and the total amount of the chromium and/or tellurium should in that case preferably not exceed 24 grams. In fact, it has been found that a proportion of about 20% by weight based on the tin content gives optimum results with respect to the improvement in electric conductivity and stabilization of shrinkage. Above 20% the improvement begins to decrease although the said properties are better than those of stannic oxide refractories containing no chromium or tellurium.

When a tellurium compound is incorporated in the refractory composition, it is preferred that the amount of tellurium introduced into the refractory composition be less than about 5% by weight based on the tin content of the composition. In such case, therefore, it is preferred to incorporate one or more chromium compounds in conjunction with the tellurium compound(s) if the optimum results of electrical conductivity and shrinkage are desired. It is preferable to keep the tellurium content below the proportion referred to because, when higher proportions of tellurium are present, a vitreous layer which is compact but somewhat fusible at high temperature tends to form on the surface of the refractory body, particularly in refractories in which the stannic oxide is "diluted" with other refractory constituents, e.g. zirconia. Moreover, higher tellurium percentages are not favorable to the filling up of the lacunae in the conducting network.

In practice, it is preferred that the total amount of chromium and tellurium in the refractory be between about 0.05% and about 5% by weight based on the tin content. A proportion of about 0.05% by weight is about the minimum for realizing a significant improvement in the electrical conductivity, the shrinkage stability and the behavior of the refractory in contact with molten glass. On the other hand, the improvement in these properties increases markedly with increase in the chromium and/or tellurium content up to about 5% by weight based on the tin content. Within this range 0.05 to 5% by weight even a small increase in the amount of the chromium and/or tellurium content considerably improves the properties and at the upper end of the range (5% by weight) the properties of the refractories are almost as good as those which can be realized by further increasing the chromium and/or tellurium content up to about 20% by weight based on the weight of the tin. Moreover when adding chromium and/or tellurium compounds in small proportions it is possible to form the stannic oxide and the chromium and/or tellurium compounds into a paste in precisely the same way as a paste is conventionally formed from stannic oxide alone.

As previously stated, a variety of chromium and tellurium compounds can be used in the manufacture of refractory bodies according to the present invention. The form or forms in which the chromium and/or tellurium is present in the final refractory will depend in part on the choice of starting compound(s) but at least part of the chromium or tellurium will normally be present in the final refractory as an oxide or oxides.

In addition to the oxides, hydroxides, silicates and phosphates which have been set forth, chromium aluminates and organometallic compounds such as chromium-carbonyl are examples of compounds which can be utilized as starting materials. If a hydroxide is used, it becomes in part changed into an oxide when the initial mixture is subjected to sintering, whereas silicates change partly into silica and partly into the oxide. The formulae of the compounds formed by sintering the pyrophosphates and the aluminates are more difficult to determine. However it appears that chromium and tellurium have the effect of improving the properties of the refractory bodies whatever may be the formula of the chemical compounds in which they are introduced into the refractory mass in the course of manufacture of such bodies.

The simplest procedure of producing the refractory composition of the present invention is to mix the chromium and/or tellurium in the form of an oxide or oxides with the stannic oxide and any other refractory constituents which may be used. In this way, one can avoid not only the release of gases, e.g. water vapor, during heating of the mass, but also the occurrence of secondary reactions between the basic constituents of the refractory material and foreign elements which may be present as impurities in other chromium and tellurium compounds. Moreover it has been found that when tellurium oxide, which has a boiling point of 1250° C., is incorporated as such into a refractory according to the present invention, this oxide does not show any tendency to melt when the refractory is heated to 1500° C., even when used in a proportion of more than 5% by weight based on the stannic oxide. It is therefore preferred that at least part of the compounds of chromium and/or tellurium be present as an oxide.

Furthermore, it has been found that chromium and tellurium oxides have a structure which adapts itself to the structure of the stannic oxide in a way which is conducive to the formation of particularly compact refractory masses. There is a strengthening of the atomic structure of the stannic oxide as a result of which it is possible to form refractory bodies in which the shrinkage is well stabilized and the degree of porosity is less than 5%.

Also it has been found advantageous to incorporate at least one niobium or manganese compound or a mixture of niobium and manganese compounds in conjunction with the chromium and/or tellurium compound(s) of the present invention. The gram-atomic ratio of the niobium and manganese, however, to the chromium and tellurium should not exceed 1:1. The compounds of these materials that can be used are similar to those set forth above for chromium and/or tellurium.

It is surprising that although the manganese and niobium compounds when used alone as additives to stannic oxide do not improve the electrical conductivity, and in fact even lower it, their presence in association with chromium and tellurium compounds still further increases the electrical conductivity beyond that which can be attained by using chromium and/or tellurium compounds alone. This further increase in conductivity is mainly evident in the low temperature range (500 to 800° C.). On the other hand, the association of niobium and/or manganese compound(s) with the chromium and/or tellurium compound(s) in the stannic oxide refractories further improves the behavior of the refractories in contact with molten glass, in particular with respect to the tendency of bubble formation. This is improved so much, in fact, that the refractories can withstand the action of particularly aggressive glasses such as those rich in silica, at temperatures exceeding 1500° C.

The improvements resulting from the addition of niobium and/or manganese compounds appear to be greatest when the gram-atomic ratio of the niobium and manganese to the chromium and tellurium is 1:1 (hereafter called "stoichiometric equivalence"). However, in practice, the amount of niobium and manganese is preferably from 1 to 10% of the amount corresponding to the stoichiometric equivalence. The principal improvements in the properties of the refractories occur and increase rapidly over this range of addition and the further improvements which can be realized by adding quantities of niobium and/or manganese in quantities of more than the said 10% are not normally sufficient to warrant the use of such additional quantities. Manganese and niobium additions below 1% of the stoichiometric equivalence are useful but uniform distribution of such smaller quantities in the refractory mass is difficult to achieve.

Preferably at least part of the chromium, tellurium, niobium or manganese incorporated into the initial mass is incorporated in the form of niobium, and/or manganese chromate and/or telluride. It has been observed that the results obtained with various combinations of chromium and tellurium on the one hand and niobium and manganese on the other hand can be more precisely determined when the proportions of these additives which are combined in a definite chemical form are higher. In effect, in manganese chromate for example, the chromium and manganese atoms are in an intimate association better than can be achieved in a mixture of different chromium and manganese compounds, however thoroughly prepared.

Similar results can be obtained by employing chemical equivalents such as niobium or manganese chromites, chromium or tellurium manganates or permanganates or chromium or tellurium niobates.

The invention as well as the advantages resulting therefrom will now be further explained by reference to the following specific examples.

It is to be understood that these examples are for purposes of illustration only and the present invention is in no way to be deemed as limited thereto.

Example I

Twenty-one bricks were made from refractory masses of different compositions all being based on stannic oxide. The compositions of the bricks (numbered 1 to 21), are given in the following Table I from which it will be seen that brick No. 1 was made solely from stannic oxide whereas the other twenty bricks incorporated proportions of chromium, tellurium, niobium and/or manganese which differed from one brick to another.

The bricks were prepared in the following manner.

Finely divided cassiterite grains of a size between 0.06 and 0.10 mm. constituted the basic ingredient. The other ingredients (used in bricks 2 to 21) were chemically pure oxides in the form of particles between 0.01 and 0.06 mm.

In each case water was added to the finely divided constituent or constituents in a quantity just sufficient for preparing a stiff paste (130 g. water per kg. dry material(s)). This paste was subsequently pressed at the ambient temperature into a mold measuring 10 x 10 x 10 cm. and subjected to a pressure of 350 kg./cm.$^2$ for 10 minutes. The bricks, when they were extracted from the molds, were sufficiently solid to be handled without breaking. The bricks were dried in air for 48 hours and then heated in a furnace the temperature of which was increased to 1500° C. in steps of 150° C., each heating stage lasting for one hour. The bricks were then slowly cooled. The surfaces of all the bricks showed neither deformations nor cracks.

In the case of each brick the mean values of the electrical conductivity at different temperatures and of the linear shrinkage were measured. The shrinkage of each brick was also measured after it had been in contact with molten glass for one month under the flux line of a glass-melting furnace maintained at a temperature of 1500° C.

The results obtained are shown in Table I in which: column 1 contains the reference numbers of the twenty-one bricks; column 2 gives the weight of stannic oxide in the brick composition (which weight is 100 kg. in each case); column 3 gives the weight of tin in the composition (78.8 kg. in each case); and columns 4, 5, 6, 7 give the weights of chromium, tellurium, niobium and manganese which were added in the form of $Cr_2O_3$, $TeO_2$, $Nb_2O_5$, $MnO_2$, respectively, said oxides being chemically pure. The weights of these oxides actually added in the different compositions can easily be calculated. For example, in $Cr_2O_3$ 104 kg. of chromium combine with 48 kg. oxygen, and therefore the 1.2 kg. of chromium in brick No. 9 corresponds with the addition of 1.755 kg. of $Cr_2O_3$. It must also be taken into account that the oxide may contain a certain quantity of water which must be determined analytically and allowed for in determining the gross weight of oxide to be added.

Columns 8 and 9 of Table I respectively give the ratio of the atoms of niobium and manganese to the sum of the atoms of chromium and tellurium. Thus, by way of example, brick No. 18 contains 10 kg. chrome, 5 kg. tellurium and 0.255 kg. manganese. As kilogram atoms of chromium, tellurium and manganese weigh 52, 127.6 and 55 kg. respectively, brick No. 18 contains:

Chromium ------ 10 kg./52 kg.=0.192 kiloatoms.
Tellurium ------- 5 kg./127.6 kg.=0.0392 kiloatoms.
Manganese ------ 0.255 kg./55 kg.=0.00464 kiloatoms.

The molecular ratio manganese/(chrome and tellurium) is thus equal to:

$$0.00464/(0.192+0.0392)=2\% \text{ (approx.)}$$

Column 10 gives the atomic ratio of the niobium and manganese on the one hand to the chromium and tellurium on the other. This ratio is obviously equal to the sum of the ratios in columns 8 and 9. The data given by column 10 are important because it has been observed that the characteristics of refractory bodies are improved by niobium and manganese to the same extent, so that it is the aggregate proportion of these elements which is the important consideration.

Columns 11 and 12 give the specific electrical conductivities of the various bricks (expressed in ohm$^{-1}$ cm.$^{-1}$) at temperatures of 1400° C. and 900° C. respectively and measured in an inert gas under a pressure of one atmosphere.

The porosity of the bricks expressed in terms of total pore volume as a percentage of the total volume of the brick has also been measured. Low porosity means great compactness. The porosity measured included "open"

pores as well as "closed" ones because the measurements were made by the gravimetric method. After the cold compression the porosity of all bricks was of the order of 50%. After baking at a temperature of 1500° C., the degree of porosity of the first brick, made entirely of $SnO_2$, was 5% approximately, but after it had been used one month under the flux line of a glass-melting furnace at a temperature of 1500° C., the degree of porosity was 1.5%, which proves that the brick continued to shrink during use. On the other hand the porosity of each of the bricks 2 to 21 after the baking step was less than 5% and its porosity was not changed by use for one month under the flux line of a glass-melting furnace at 1500° C.

ties of the bricks 12 and 12' showed that the mean values in the two cases were identical but that the statistical deviations from the mean value were in the case of brick No. 12' three times lower than in the case of brick No. 12.

The essential technical data given in Table I, and data compiled from further tests, are shown in graphical form in the accompanying drawings in which.

TABLE I

Figure 1:
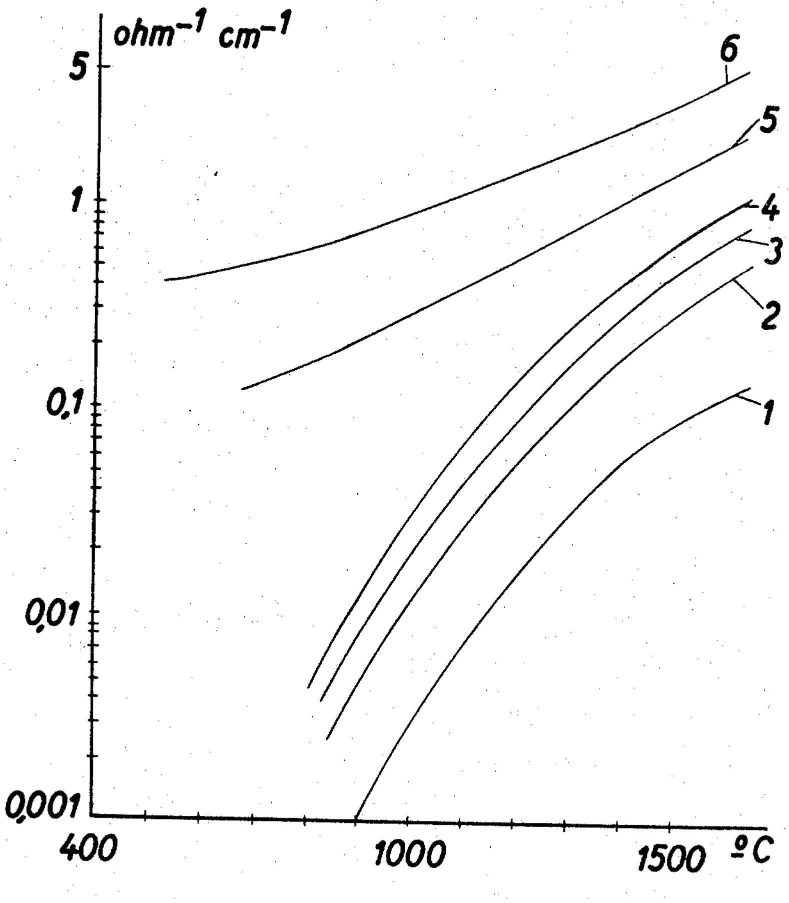
FIGURE 1 is a graph showing how the electrical conductivity of refractory bodies based on stannic oxide varies with the temperature.

| 1 | 2 | 3 | 4 | 5 | 6 | 7 | 8 | 9 | 10 | 11 | 12 |
|---|---|---|---|---|---|---|---|---|---|---|---|
| Brick No. | Weight of $SnO^2$ in kg. | Weight of Sn in kg. | Weight of Cr in kg. | Weight of Te in kg. | Weight of Nb in kg. | Weight of Mn in kg. | Atomic ratio Nb/Cr+Te | Atomic ratio Mn/Cr+Te | Atomic ratio Nb+Mn/Cr+Te | Specific electrical conductivity at 1400° C. ($ohm^{-1}$ $cm.^{-1}$) | Specific electrical conductivity at 900° C. ($ohm^{-1}$ $cm.^{-1}$) |
| 1 | 100 | 78.8 | | | | | | | | 0.06 | 0.001 |
| 2 | 100 | 78.8 | 0.01 | 0.03 | | | | | | 0.08 | 0.002 |
| 3 | 100 | 78.8 | 0.01 | 0.03 | | 0.012 | | 0.5 | 0.5 | 0.4 | 0.16 |
| 4 | 100 | 78.8 | 0.01 | 0.03 | 0.02 | 0.012 | 0.5 | 0.5 | 1 | 0.6 | 0.3 |
| 5 | 100 | 78.8 | 0.01 | 0.03 | 0.04 | | 1 | | 1 | 0.6 | 0.3 |
| 6 | 100 | 78.8 | 0.01 | 0.03 | 0.03 | 0.006 | 0.75 | 0.25 | 1 | 0.6 | 0.3 |
| 7 | 100 | 78.8 | 0.04 | | | | | | | 0.1 | 0.0025 |
| 8 | 100 | 78.8 | | 0.5 | | | | | | 0.1 | 0.0025 |
| 9 | 100 | 78.8 | 1.2 | 0.5 | | | | | | 0.2 | 0.004 |
| 10 | 100 | 78.8 | 1.2 | 0.5 | 0.75 | 1.04 | 0.3 | 0.7 | 1.0 | 0.97 | 0.5 |
| 11 | 100 | 78.8 | 1.2 | 0.5 | 1.5 | 2.08 | 0.6 | 1.4 | 2.0 | 0.985 | 0.56 |
| 12 | 100 | 78.8 | 1.2 | 0.5 | 3 | 4.16 | 1.2 | 2.8 | 4.0 | 0.999 | 0.60 |
| 13 | 100 | 78.8 | 1.6 | 1.6 | | | | | | 0.24 | 0.007 |
| 14 | 100 | 78.8 | 0.4 | 3.5 | | | | | | 0.27 | 0.007 |
| 15 | 100 | 78.8 | 8 | 3.5 | | | | | | 0.4 | 0.013 |
| 16 | 100 | 78.8 | 10 | 5 | | | | | | 0.38 | 0.016 |
| 17 | 100 | 78.8 | 10 | 5 | | 0.127 | | 0.01 | 0.01 | 0.4 | 0.02 |
| 18 | 100 | 78.8 | 10 | 5 | | 0.255 | | 0.02 | 0.02 | 0.5 | 0.023 |
| 19 | 100 | 78.8 | 10 | 5 | | 0.635 | | 0.05 | 0.05 | 0.6 | 0.024 |
| 20 | 100 | 78.8 | 10 | 5 | | 3.175 | | 0.25 | 0.25 | 0.8 | 0.25 |
| 21 | 100 | 78.8 | 15 | | | | | | | 0.41 | 0.017 |

Example II

Two bricks were made (bricks Nos. 1' and 16') having the same compositions as bricks Nos. 1 and 16 in Table I except that an amount of zirconia equal to the weight of the $SnO_2$ was incorporated in each case. Tests showed that the resistance of these bricks 1' and 16' to corrosion, in contact with soda lime glasses, was practically the same as the resistance of the bricks 1 and 16 which were richer in stannic oxide. Table II gives the electrical conductivities of the bricks 1, 16, 1', 16' at a temperature of 1400° C. and shows the beneficial influence of the chromium and tellurium additions, even in refractories in which the stannic oxide is mixed with a high proportion of some other refractory material.

TABLE II

| Sample No. | Specific electric conductivity at a temperature of 14,000° C. ($ohm^{-1}$ $cm.^{-1}$) |
|---|---|
| 1 | 0.06 |
| 16 | 0.38 |
| 1' | 0.04 |
| 16' | 0.30 |

Example III

A brick (No. 12') was made from a composition having chromium, tellurium and manganese contents identical with those of brick No. 12 but in the starting mixture the manganese oxide and a part of the chromium oxide used in forming brick No. 12 were replaced by manganese chromite. The starting mixture for brick No. 12' thus contained:

| | Kg. |
|---|---|
| $SnO_2$ | 100 |
| $MnCr_2O_4$ | 1.69 |
| Cr in combination with oxygen ($Cr_2O_3$) | 0.45 |
| Te in combination with oxygen ($Te_2O_3$) | 0.5 |

A comparison of the mechanical and electrical propermeasured at temperatures of 900° C. and 1400° C., depends on the percentage of additives.

Figure 3:
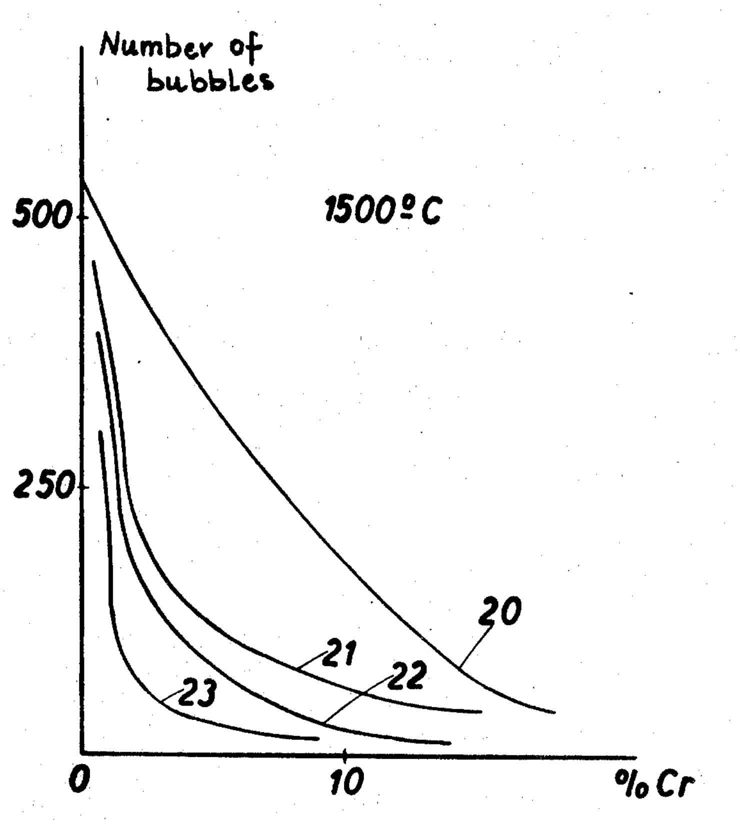

FIGURE 3 is a graph showing how the percentage of additives influence the extent to which bubble formation occurs when the refractories are in contact with molten glass.

Figure 4:
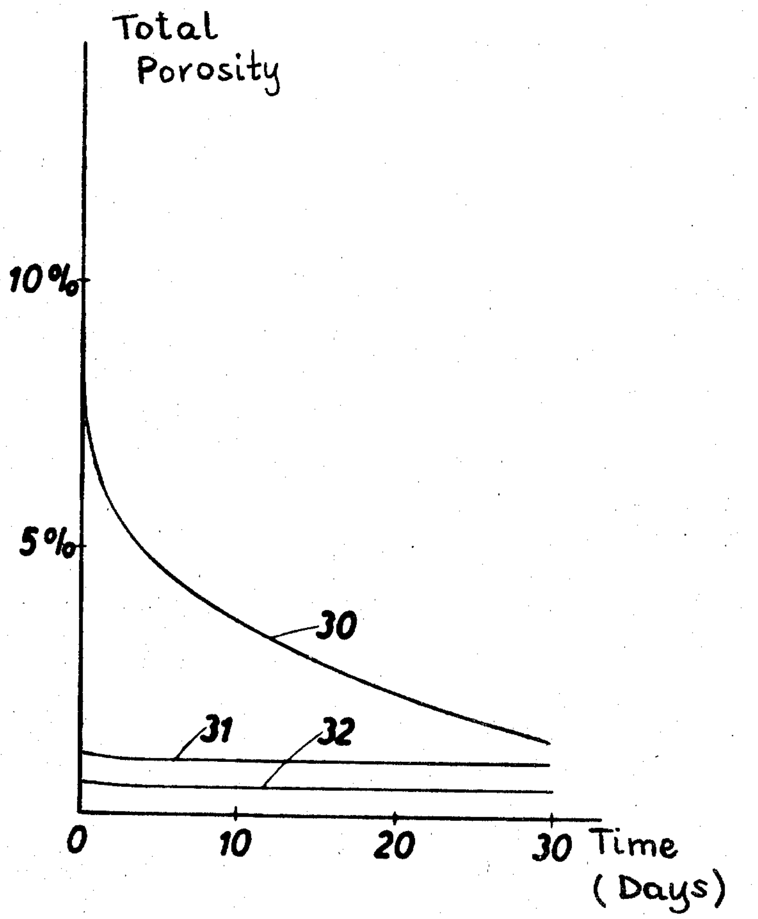

FIGURE 4 is a graph showing how the porosity of various refractory bodies varies during contact with molten glass at a temperature of 1500° C.

In FIGURE 1, the specific electrical conductivities of the stannic oxide bodies, expressed in $ohm^{-1}$ $cm.^{-1}$, are plotted on a logarithmic ordinate scale against temperature over the range 500° to 1500° C.

The curve 1 relates to a refractory composed wholly of stannic oxide, whereas the curves 2, 3 and 4 relate to refractories comprising stannic oxide together with 1, 5 and 20% respectively of chromium present as chromium oxide.

It is apparent that the electrical conductivity considerably increases as the percentage of chromium oxide increases.

The curves 5 and 6 relate to refractories comprising stannic oxide, 5% chromium and proportions of niobium and manganese compounds such that the atomic ratio $$\frac{Nb+Mn}{Cr+Te}$$

is equal to 2% (curve 5) and 100% (curve 6).

It is apparent that the electrical conductivity of refractories based on stannic oxide and incorporating chromium oxide is much influenced by the presence of niobium and manganese compounds, even if these compounds are present in very small quantities. It is immaterial whether niobium alone, manganese alone or equal or unequal quantities of both these elements are present; it is the total amount of niobium and/or manganese present in any given case which determines the way in which the properties of the refractory are influenced. Moreover, the curves 5 and 6 show that the improvement in electrical conductivity due to the addition of such further element or elements is most evident over the lower end of the temperature range, e.g., between 500° and 1100° C.

Figure 2:
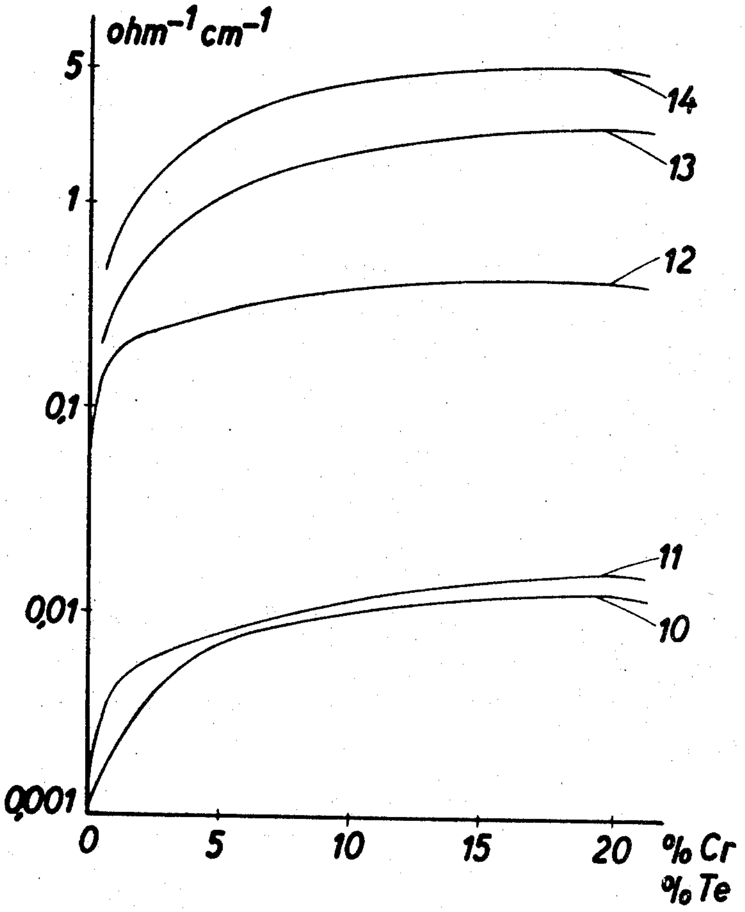
FIGURE 2 is a graph showing how the electrical conductivity of refractory bodies based on stannic oxide.

The graph forming FIGURE 2, shows how the specific electrical conductivities of stannic oxide masses containing percentages of chromium or tellurium (present as chromium and tellurium compounds) between 0 and 20% based on the weight of the tin, are influenced by the presence of other elements and by temperature. The conductivities are again expressed on a logarithmic scale in $ohm^{-1}\ cm.^{-1}$.

Curve 10 relates to masses incorporating a tellurium compound, the electrical conductivities being measured at 900° C. The curve 11 relates to masses containing a chromium compound, the conductivities being also measured at 900° C.

Curve 12 shows the conductivities of masses having the same composition as those represented by curve 11, at 1400° C.

The curves 13 and 14 show the conductivities at 1400° C. of masses which, in addition to the given percentage of chromium, comprise niobium and/or manganese in proportions such that the atomic ratio $$\frac{Nb+Mn}{Cr+Te}$$

is equal to 2% (curve 13) and 100% (curve 14). (The amount of tellurium in these examples is in fact nil.)

The curves 10, 11 and 12 show that the incorporation of increasing amounts of chromium and tellurium up to 5% of the weight of the tin contained in the stannic oxide, considerably and rapidly increases the electrical conductivity of the mass. With increase in the amount of chromium or tellurium above 5%, the electrical conductivity increases more slowly and reaches a maximum when the proportion of chromium or tellurium is approximately 20%.

The curves 12, 13 and 14 show that the addition of niobium and manganese is beneficial but the additions are relatively more effective for low values of the atomic ratio $$\frac{Nb+Mn}{Cr+Te}$$

In fact the more effective ratios lie between 1 and 10%.

The numbers of bubbles which form in a period of one month when stannic oxide refractory walls of a laboratory glass-melting furnace measuring 3 x 3 x 3 dm. come into contact with molten glass at a temperature of 1500° C., are represented by the ordinates of the curves shown in FIGURE 3. The abscissae of these curves represent the percentages by weight of chromium in the tested stannic oxide refractories, such percentages being precentages by weight based on the weight of tin contained in the refractories. The bubbles formed when the molten glass comes into contact with the walls of the furnace disperse through the whole mass of the molten glass. Their diameter is generally in the region of 1 mm.

Curve 20 relates to stannic oxide refractories containing chromium in proportions ranging from 0 to 20%. Comparative tests have shown that identical results to those represented by curve 20 are obtained when using refractories comprising 0 to 5% of tellurium based on the weight of tin, instead of 0–20% by weight of chromium.

Curves 21, 22 and 23 relate to refractories comprising the indicated proportions of chromium together with a proportion of manganese oxide such that the molecular ratio Mn/Cr is equal to 5% (curve 21), 10% (curve 22) and 30% (curve 23).

It is apparent from the graph, that the number of bubbles, which exceeded five hundred in a glass volume of 27 $dm.^3$ when using a refractory without chromium or manganese, is considerably reduced when using refractories containing chromium compounds and that by incorporating in addition to a chromium compound in a proportion, e.g., such that the quantity of chromium present is 10% by weight of the tin, a quantity of manganese compound in a proportion such that the niobium content is as small as 5% of the stoichiometric equivalence (as hereinbefore defined), the number of bubbles is reduced practically to nil.

The graph forming FIGURE 4 plots the total porosities of certain refractory bricks over a period of thirty days during which they are in contact with molten glass at a temperature of 1500° C. The porosities were determined by weighing samples taken from the bricks every five days. The bricks were formed by sintering the refractory masses at 1450° C.

The curve 30 indicates the porosity of a brick composed entirely of stannic oxide. The curve 31 relates to a brick composed to stannic oxide together with 1% chromium oxide. Curve 32 relates to a brick composed of stannic oxide together with about 1% by weight of mixed chromium and niobium oxides, the precise composition being as follows:

$SnO_2$—100 which means Sn=78.8 (percentage by weight)
$Cr_2O_3$—0.414 which means Cr=0.283 (percentage by weight)
$Nb_2O_5$—0.695 which means Nb=0.505 (percentage by weight)
The atomic ratio Nb/Cr is equal to 1:1.

The curve 30 shows, that the degree of porosity of the stannic oxide brick is 8% after being sintered at a temperature of 1450° C. but decreases in course of time until it is practically stabilized to 1.5% after one month.

In contrast, the curves 31 and 32 show that the addition of chromium or chromium and niobium reduces the degree of porosity on sintering to appreciably lower values and that the porosity does not undergo any material change during the subsequent exposure of the refractories to contact with molten glass at 1500° C. Further tests (not presented in the graph) have shown that shrinkage is also better stabilized by incorporating a mixture of niobium and chromium compounds than by adding only a chromium compound.

In the foregoing description of the invention, emphasis has been laid on the preparation of sintered refractory bodies. It is to be understood, however, that refractory compositions based on stannic oxide and characterized by the presence of one or more chromium and/or tellurium compounds afford benefits such as better electrical conductivity at temperatures below 900° C. regardless of whether they are in sintered form. Such compositions may, e.g., be used with advantage in discrete form in the preparation of refractory clays or mortars. Consequently the present invention includes any refractory composition based on stannic oxide and incorporating one or more chromium and/or tellurium compounds whether that composition be formed into a shaped body or not. Moreover insofar as the invention relates to shaped refractory bodies it includes not only refractory bricks which have hereinbefore been repeatedly mentioned, but any other shaped refractory bodies, e.g., electrodes or furnace linings formed by application of discrete refractory compositions according to the invention.

It will be understood that the above description of the present invention is susceptible to various modifications, changes and adaptations, and the same are intended to be comprehended within the meaning and range of equivalents of the appended claims.

What is claimed is:

1. A refractory composition comprising stannic oxide and containing at least one compound selected from the group consisting of carbonyls and inorganic compounds of chromium, tellurium and mixtures thereof, the amount of chromium, tellurium, and mixtures thereof present as components of said chromium and tellurium compounds and mixtures thereof being between about 0.05% and about 20% by weight based on the weight of the tin present as a component of said stannic oxide.

2. The refractory composition of claim 1, wherein the composition is in the form of a sintered body.

3. The refractory composition of claim 1, wherein the composition is in discrete form.

4. The refractory composition of claim 1 wherein the stannic oxide and the compounds selected from the group consisting of carbonyls and inorganic compounds of tellurium, chromium and mixtures thereof together constitute at least 50% by weight of the total composition.

5. The refractory composition of claim 1 wherein the tellurium present as said tellurium compound is present in an amount less than 5% by weight based on the weight of tin present as said stannic oxide.

6. The refractory composition of claim 1 wherein the total amount of chromium and tellurium present as said chromium and tellurium compounds is from 0.05 to 5% by weight based on the tin present as said stannic oxide.

7. The refractory composition of claim 1 wherein at least part of the compounds selected from the group consisting of carbonyls and inorganic compounds of chromium, tellurium and mixtures thereof is present as an oxide.

8. The refractory composition of claim 1 wherein an additional material selected from the group consisting of inorganic compounds of niobium, manganese and mixtures thereof is present in an amount whose gram-atomic ratio to the compounds selected from compounds of chromium, tellurium and mixtures thereof is less than 1:1.

9. The refractory composition of claim 8 wherein the material selected from the group consisting of inorganic compounds of niobium, manganese and mixtures thereof is present in an amount of from about 1% to about 10% by weight of the compounds of chromium, tellurium and mixtures thereof.

10. A method of making a refractory body which comprises mixing finely divided stannic oxide with a compound selected from the group consisting of carbonyls and inorganic compounds of chromium, tellurium and mixtures thereof the amount of chromium, tellurium and mixtures thereof present as components of said compounds of chromium and tellurium and mixtures thereof being between about 0.05% and about 20% by weight of the tin present as a component of said stannic oxide, shaping the mixture in wet condition under pressure and subsequently subjecting the mixture to sintering conditions.

11. A refractory composition comprising stannic oxide and containing at least one compound selected from the group consisting of the compounds niobium chromate, manganese chromate, niobium telluride, manganese telluride and mixtures thereof, the total amount of chromium and tellurium present as components of said compounds and mixtures thereof being between 0.05% and 20% by weight based on the weight of tin present as a component of said stannic oxide.

References Cited

UNITED STATES PATENTS

| | | | |
|---|---|---|---|
| 2,244,777 | 6/1941 | Hood | 106—55 |
| 2,467,144 | 4/1949 | Mochel | 106—55 |
| 3,287,284 | 11/1966 | Norman | 106—55 |

JAMES E. POER, *Primary Examiner.*

U.S. Cl. X.R.

106—57, 65, 66